United States Patent
Smets et al.

(10) Patent No.: US 10,840,975 B2
(45) Date of Patent: Nov. 17, 2020

(54) ENHANCED DEVICE INTERACTION

(71) Applicant: MasterCard International Incorporated, Purchase, NY (US)

(72) Inventors: Patrik Smets, Nijlen (BE); Patrick Mestre, Sart-Bernard (BE); Florent Hay, Jette (BE); Kuan Hua Chen, London (GB); Shilpa Harvey, Surrey (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 15/662,362

(22) Filed: Jul. 28, 2017

(65) Prior Publication Data

US 2018/0034511 A1 Feb. 1, 2018

(30) Foreign Application Priority Data

Jul. 28, 2016 (GB) ..................................... 1613027

(51) Int. Cl.
| | |
|---|---|
| *H04B 5/00* | (2006.01) |
| *G06Q 20/32* | (2012.01) |
| *G06Q 20/38* | (2012.01) |
| *G06Q 20/42* | (2012.01) |
| *H04W 76/14* | (2018.01) |
| *G06Q 20/20* | (2012.01) |

(52) U.S. Cl.
CPC ......... *H04B 5/0062* (2013.01); *G06Q 20/202* (2013.01); *G06Q 20/327* (2013.01); *G06Q 20/3278* (2013.01); *G06Q 20/382* (2013.01); *G06Q 20/425* (2013.01); *H04W 76/14* (2018.02)

(58) Field of Classification Search
CPC ............... G06Q 20/202; G06Q 20/327; G06Q 20/3278; G06Q 20/382; G06Q 20/425; H04B 5/0062; H04W 76/14
See application file for complete search history.

(56) References Cited

U.S. PATENT DOCUMENTS

| | | |
|---|---|---|
| 2013/0046643 A1 | 2/2013 | Wall et al. |
| 2015/0235256 A1* | 8/2015 | Barsoum ................ G06Q 20/02 705/14.33 |
| 2016/0162238 A1* | 6/2016 | Ito ......................... G06F 3/1231 358/1.15 |

(Continued)

OTHER PUBLICATIONS

"PCT Notification of Transmittal of the International Search Report and the Written Opinion", International Searching Authority, dated Oct. 9, 2017 (Oct. 9, 2017), for International Application No. PCT/US2017/044115, 10pgs.

*Primary Examiner* — Xin Jia
(74) *Attorney, Agent, or Firm* — Buckley, Maschoff & Talwalkar LLC

(57) ABSTRACT

A method of enhanced interaction between a first computing device and a second computing device is described. A first channel for connection between the first computing device and the second computing device using a short range communication technology and a second channel for communication between the first computing device and the second computing device using a communication technology are established. A first interaction is performed using the first channel and an additional interaction is performed using the second channel. Suitable first and second computing devices are also described.

11 Claims, 14 Drawing Sheets

(56) References Cited

U.S. PATENT DOCUMENTS

| | | | |
|---|---|---|---|
| 2016/0232515 A1* | 8/2016 | Jhas | G06Q 30/02 |
| 2017/0004475 A1* | 1/2017 | White | G06Q 20/204 |
| 2018/0075446 A1* | 3/2018 | Yin | H04B 5/00 |

* cited by examiner

ENHANCED DEVICE INTERACTION

CROSS-REFERENCE TO RELATED APPLICATION

This application is a U.S. National Stage filing under 35 U.S.C. § 119, based on and claiming benefit of and priority to GB Patent Application No. 1613027.0 filed Jul. 28, 2016.

FIELD OF DISCLOSURE

The present disclosure relates to enhanced device interaction. More specifically, the present disclosure relates to methods and apparatus for providing additional user interaction in interactions based on a basic interaction mechanism.

BACKGROUND OF DISCLOSURE

The development of short range communication technologies has enabled new models of interaction that can be used in a wide range of contexts. RFID (Radio-frequency Identification) and barcode scanning establish a one way information exchange between an information bearing device (or other object) and a reader device. NFC (Near-Field Communication) protocols may be used to establish short range two-way wireless communication between devices.

These technologies are widely used in a number of contexts, such as contactless payment, ticketing, access control and logistics. They are advantageous in that the short range nature of the communication means that physical control of the communicating objects is evident to both parties, providing security—a cardholder knows that he or she is transacting with the store that he or she is standing in, and a ticket inspector knows that the ticket that he or she is reading is the one that he or she can physically see. A disadvantage is that the data exchange is limited in duration and content—if the interaction takes more than a second or so, the user experience will be affected, and content exchanged is typically either fixed or limited by the data rate of the connection.

One significant use case for NFC technologies is in contactless payment. Payment cards such as credit cards and debit cards are very widely used for all forms of financial transaction. The use of payment cards has evolved significantly with technological developments over recent years. Originally, transactions were on paper, using an imprint of a transaction card and confirmed by a signature. This approach was largely replaced by use of a magnetic stripe of a transaction card swiped through a magnetic stripe reader on a point of sale (POS) terminal to perform a transaction. Transaction cards developed to contain an integrated circuit ("chip cards" or "smart cards") that communicates with a smart card reader in the POS terminal. Using this approach, a transaction is typically confirmed by a personal identification number (PIN) entered by the card user. Cards of this type typically operate under the EMV standard for interoperation of chip cards and associated apparatus (such as POS terminals and ATMs). ISO/IEC 7816 provides a standard for operation of cards of this type.

Technology has further developed to provide payment cards which operate contactlessly—under EMV, these are covered under the ISO/IEC 14443 standard. Using such cards, the primary account number (PAN) can be read automatically from the card by a POS terminal using NFC protocols—this approach is generally referred to as "contactless" or "proximity" payment. This is typically enabled by embedding of an NFC chip in a card body together with a suitable antenna to allow transmission and receipt of wireless signals—the transmissions may be powered by a magnetic inductive field emitted by a proximity reader in the POS terminal. For an effective transaction to be made; the payment card may need to be brought into close proximity to the proximity reader—EMVCo has defined this range under the Level 1 operating volume range of 0-4 cm.

It is now also possible to use a computing device such as a consumer mobile device as a proxy for a payment card—typically this will be a user smartphone running a mobile payment application and with access to user credentials. Such a mobile payment application will typically be securely provisioned to a consumer mobile device (hereafter "mobile phone") to act as a proxy for a payment card using NFC technology standards, which are built in to the majority of current mobile phones. Using such an application, the user can conduct 'tapping based' transactions against a proximity reader, as well as perform account management operations over an appropriate network interface (cellular, local wireless network) in an online banking interface with the user's account provider. A user may now commonly use his or her mobile phone in obtaining banking services. While other payment technologies for mobile use exist, the present applicant uses an HCE (host card emulation) solution MCBP (MasterCard Cloud Based Payments), MasterPass and DSRP (Digital Secure Remote Payment) in support of the Mobile PayPass mobile payment application.

While this "tap and go" model for payment is both convenient and popular, it provides only a limited interaction between cardholder and merchant. It would be desirable to allow a broader range of interaction between cardholder and merchant than can currently be achieved using the short, low bandwidth connection used to establish a basic interaction between the two. Such a broader range of interaction will also have value in other uses of such technologies.

SUMMARY OF DISCLOSURE

In a first aspect, the disclosure provides a method of enhanced interaction between a first computing device and a second computing device, the method comprising: establishing a first channel for connection between the first computing device and the second computing device using a short range communication technology; establishing a second channel for communication between the first computing device and the second computing device using a communication technology; and performing a first or 'basic' interaction using the first channel and performing an additional interaction using the second channel.

This approach preserves the privacy of the interaction by keeping the first interaction as a short range communication, but allows for more powerful communication capabilities of computing devices to be used to provide an additional interaction to provide additional functionality and an improved user experience.

In embodiments, the first computing device is a customer computing device, the second computing device is a merchant computing device, and the first interaction is a contactless transaction. The short range communication technology may be by NFC or in other embodiments by barcode reading. The contactless transaction may be performed according to EMV protocols.

The additional interaction may modify or augment the contactless transaction. It may provide a loyalty interaction associated with the contactless transaction, and it may enable the customer to initiate the transaction or to modify parameters of the transaction.

The communication technology for the additional interaction may be Bluetooth, WiFi or mobile data. In these cases, a socket may be established for communication between the first computing device and the second computing device.

In other embodiments, the short range communication technology and the communication technology for the additional interaction may both be NFC, and wherein one NFC tap connection may be made for the first interaction and another NFC tap connection may be made for the additional interaction.

In a second aspect, the disclosure provides an institution computing device adapted for enhanced interaction with a personal computing device, the institution computing device having a processor, a memory and at least one communication technology including a short range communication technology, wherein the institution computing device: is adapted to establish a first channel for connection with the personal computing device using a short range communication technology and to establish a second channel for communication with the personal computing device using a communication technology; and is adapted to performing a first interaction using the first channel and performing an additional interaction using the second channel.

The institution computing device may be a merchant point of sale terminal and the first interaction is a contactless transaction.

In a third aspect, the disclosure provides a personal computing device adapted for enhanced interaction with an institution computing device, the institution computing device having a processor, a memory and at least one communication technology including a short range communication technology, wherein the institution computing device: is adapted to establish a first channel for connection with the institution computing device using a short range communication technology and to establish a second channel for communication with the institution computing device using a communication technology; and is adapted to performing a first interaction using the first channel and performing an additional interaction using the second channel.

This personal computing device may be a mobile computing device adapted to perform contactless transactions and the first interaction is a contactless transaction. The personal computing device may be programmed to initiate the contactless transaction or vary parameters of the contactless transaction.

In a fourth aspect, the disclosure provides a method of establishing a contactless transaction between a user computing device and a point of sale terminal, comprising determining transaction parameters at the user computing device, populating a proximity payment system environment with the determined transaction parameters, and initiating a contactless payment with the point of sale terminal. A user computing device and a point of sale terminal adapted to perform this method are also provided.

In a fifth aspect, the disclosure provides a method of transaction with a mobile computing device, wherein the mobile computing device is adapted to transact using one or more payment cards associated with a digital wallet, wherein the method comprises scanning barcodes of one or more goods items in a merchant store, making payment for the scanned goods items using one of the one or more payment cards, and receiving a confirmation transaction to the user computing device. A user computing device and software adapted to program a processor of a user computing device to perform this method are also provided.

Note that preferred and/or optional features of either of the aspects of the disclosures may be combined with any of the other aspects where appropriate.

BRIEF DESCRIPTION OF FIGURES

Embodiments of the disclosure will now be described, by way of example, with reference to the accompanying Figures, of which.

DESCRIPTION OF SPECIFIC EMBODIMENTS

General and specific embodiments of the disclosure will be described below with reference to the Figures.

Figure 1:
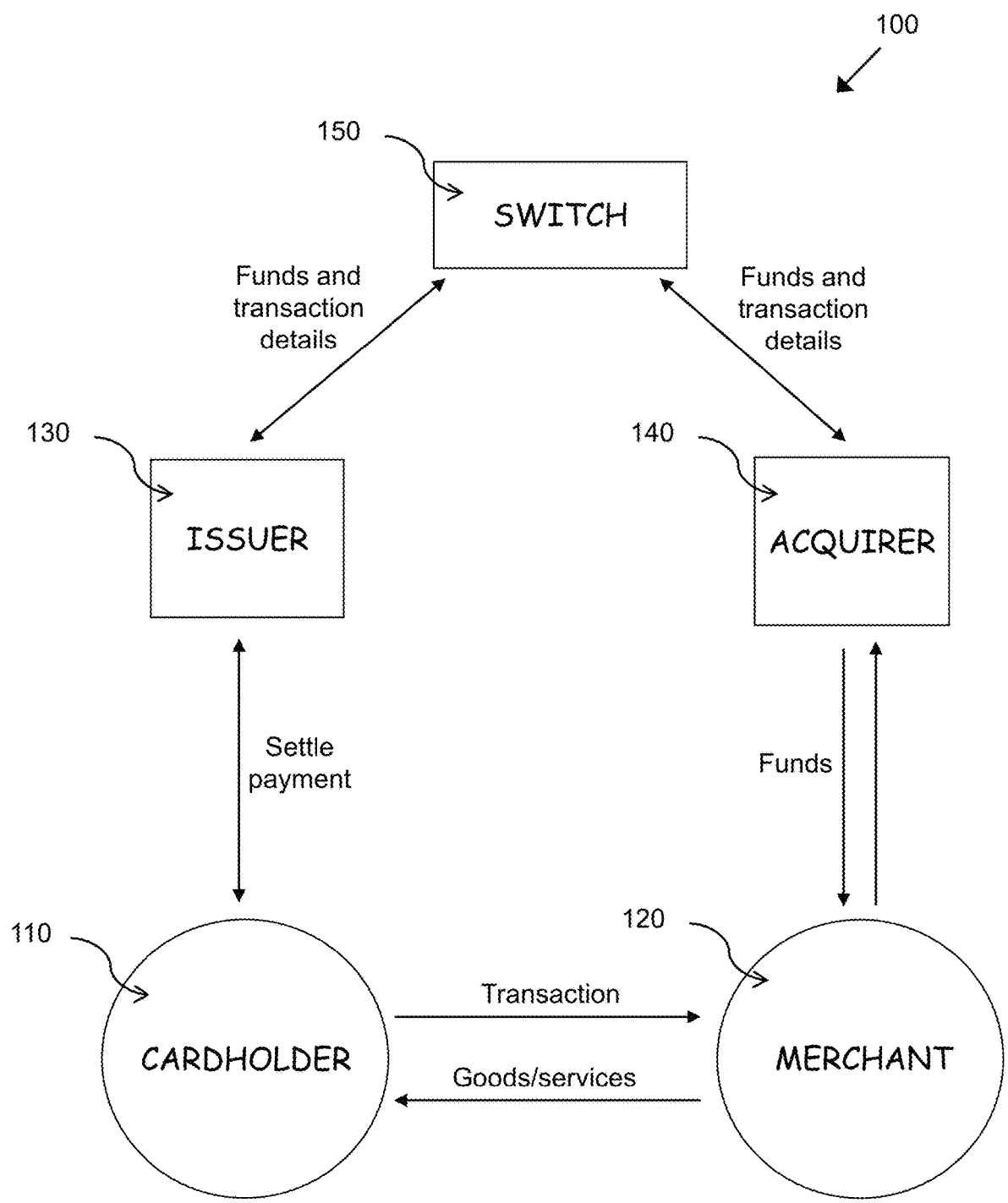
FIG. 1 shows schematically a transaction system using the four-party model.

FIG. 1 is a block diagram of a typical four-party model or four-party payment transaction scheme. The diagram illustrates the entities present in the model and the interactions occurring between entities operating in a card scheme.

Normally, card schemes—payment networks linked to payment cards—are based on one of two models: a three-party model or a four-party model (adopted by the present applicant). For the purposes of this document, the four-party model is described in further detail below.

The four-party model may be used as a basis for the transaction network. For each transaction, the model comprises four entity types: cardholder 110, merchant 120, issuer 130 and acquirer 140. In this model, the cardholder 110 purchases goods or services from the merchant 120. The issuer 130 is the bank or any other financial institution that issued the card to the cardholder 110. The acquirer 140 provides services for card processing to the merchant 120.

The model also comprises a central switch 150—interactions between the issuer 130 and the acquirer 140 are routed via the switch 150. The switch 150 enables a merchant 120 associated with one particular bank acquirer 140 to accept payment transactions from a cardholder 110 associated with a different bank issuer 130.

A typical transaction between the entities in the four-party model can be divided into two main stages: authorisation and settlement. The cardholder 110 initiates a purchase of a good or service from the merchant 120 using their card. Details of the card and the transaction are sent to the issuer 130 via the acquirer 140 and the switch 150 to authorise the transaction. Should the transaction be considered abnormal by the issuer 130, the cardholder 110 may be required to undergo an additional verification process to verify their identity and the details of the transaction. Once the additional verification process is complete the transaction is authorised.

On completion of the transaction between the cardholder 110 and the merchant 120, the transaction details are submitted by the merchant 120 to the acquirer 140 for settlement.

The transaction details are then routed to the relevant issuer 130 by the acquirer 140 via the switch 150. Upon receipt of these transaction details, the issuer 130 provides the settlement funds to the switch 150, which in turn forwards these funds to the merchant 120 via the acquirer 140.

Separately, the issuer 130 and the cardholder 110 settle the payment amount between them. In return, a service fee is paid to the acquirer 140 by the merchant 120 for each transaction, and an interchange fee is paid to the issuer 130 by the acquirer 140 in return for the settlement of funds.

In practical implementations of a four-party system model, the roles of a specific party may involve multiple elements acting together. This is typically the case in implementations that have developed beyond a contact-based interaction between a customer card and a merchant terminal to digital implementations using proxy or virtual cards on user computing devices such as a smart phone.

Figure 2:
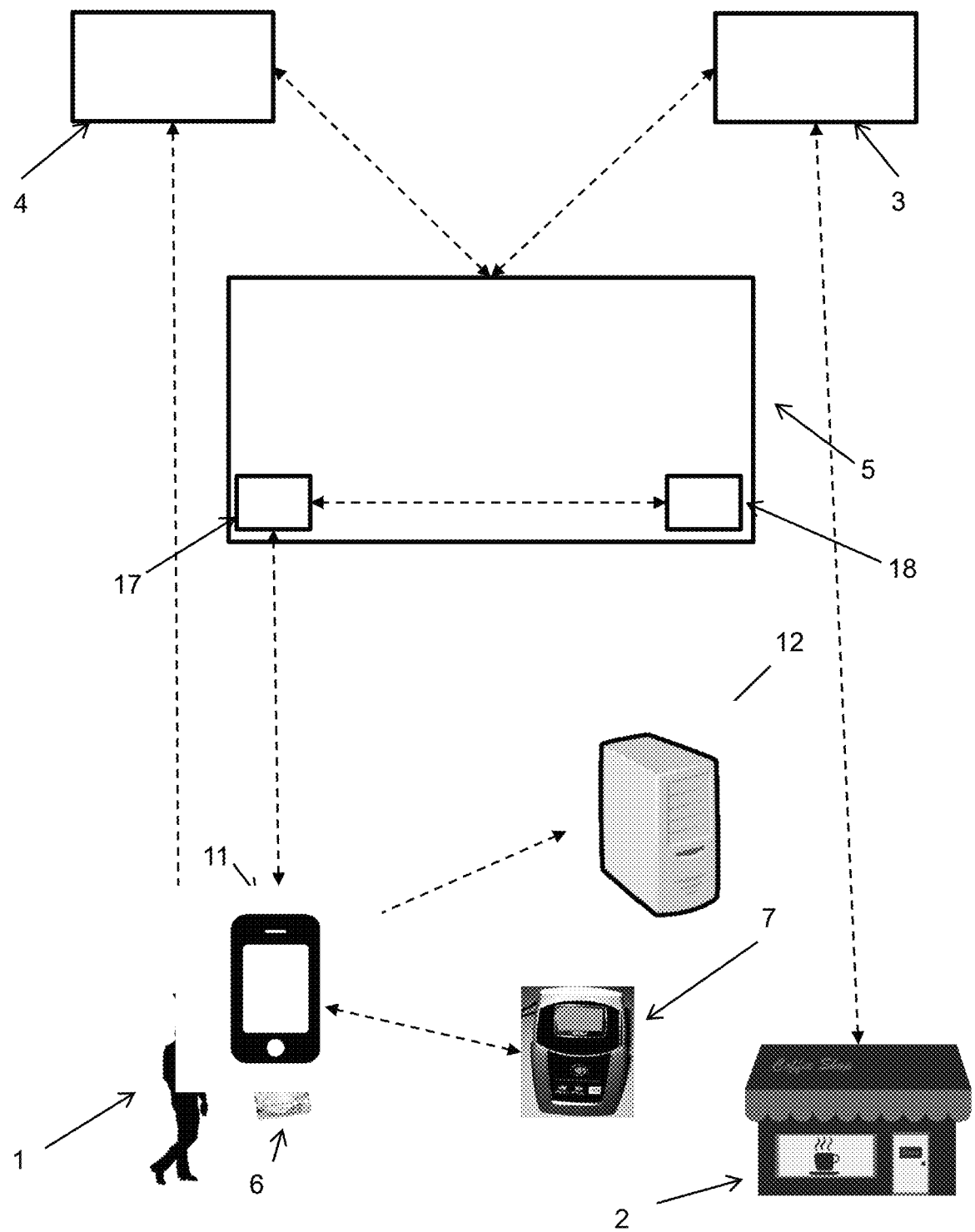
FIG. 2 shows an implementation of the transaction system of FIG. 1 adapted for performing embodiments of the disclosure.

FIG. 2 shows an architecture according to an embodiment of the disclosure appropriate for interaction between a user computing device and a merchant point of sale (POS) terminal.

The cardholder 1 uses their computing device—which may be any or all of a cellular telephone handset, a tablet, a laptop, a static personal computer or any other suitable computing device (here a cellular telephone handset or smartphone 11 is shown)—to act either as a proxy for a physical payment card 6 or as a virtual payment card operating only in a digital domain. The smartphone 11 achieves this with a mobile payment application, as described below. The smart phone 11 is thus able to transact with a merchant POS terminal 7 using NFC or another contactless technology. The smartphone 11 may also be able to interact with a merchant server 12 representing the merchant 2 over any appropriate network connection, such as the public internet. The smartphone 11 may have previously downloaded a merchant application for installation on the smartphone 11 that mediates such interaction.

The transaction infrastructure 5 provides not only the computing infrastructure necessary to operate the card scheme and provide routing of transactions and other messaging to parties such as the acquirer 3 and the issuer 4, but also a wallet service 17 to support a digital wallet on the cardholder computing device, and an internet gateway 18 to accept internet based transactions for processing by the transaction infrastructure. In other embodiments, the wallet service 17 may be provided similarly by a third party with an appropriate trust relationship with the transaction scheme provider.

Figure 3A:
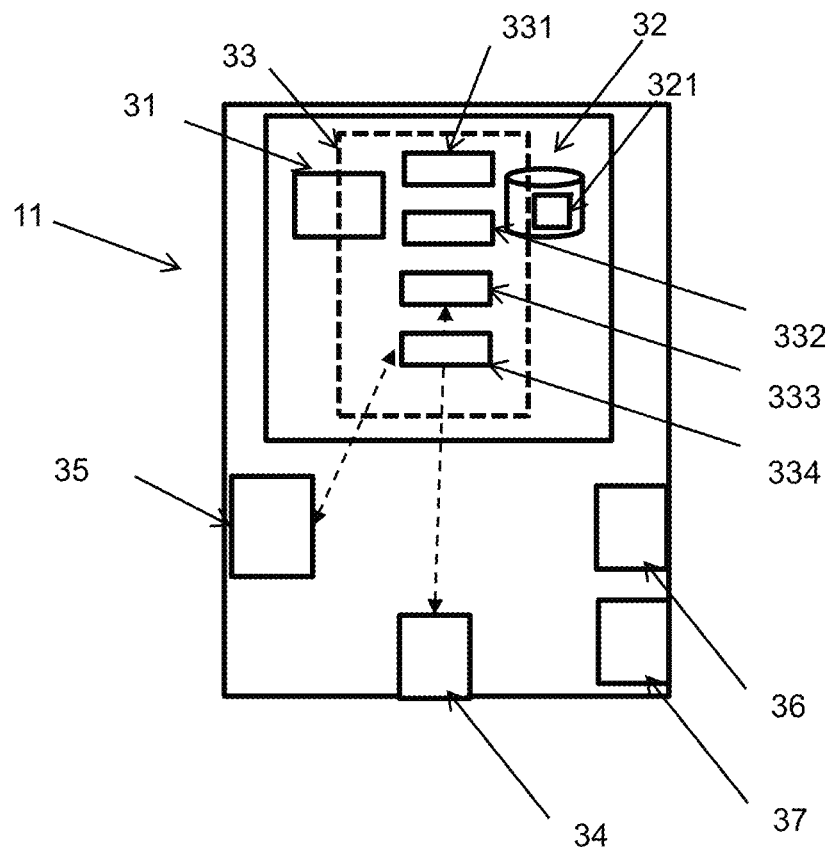
FIGS. 3A and 3B show, respectively, functional elements of a user computing device and a terminal device for use in the transaction system implementation of FIG. 2.
Figure 3B:
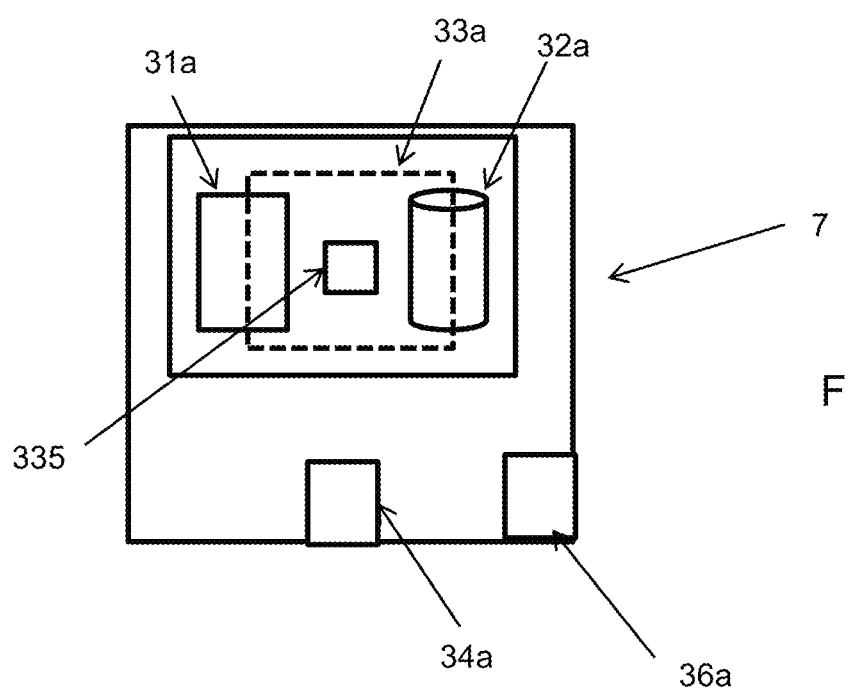

FIGS. 3A and 3B illustrate schematically by function a user computing device and a merchant POS device respectively. Other elements of the architecture of FIG. 2 are either not modified in embodiments of the disclosure, or are organised in an essentially conventional manner (for example merchant server 12, which may be implemented by an industry standard server programmed to have a conventional server/client relationship with clients such as the merchant application on a user's smartphone).

FIG. 3A shows a user computing device, in this case a smartphone 11. The smartphone possesses at least one processor 31 and at least one memory 32, between them defining a computing environment 33 for performance of applications. Applications running in the computing environment include a wallet application 331, a merchant application 332 and a proximity payment system environment 333, which are described in further detail below. Other elements may be present such as a biometric application 334 which may be used to authenticate the user 1 of the smartphone 11 before an action is taken. The memory 32 may contain one or more physically or logically protected regions 321 for protection of sensitive data required by these applications—such secure environments may be implemented in a variety of ways (as the skilled person will appreciate) and are not shown explicitly here, but access to secure data handling will typically be required by both a wallet application and a biometric application.

The smartphone 11 is of course adapted for cellular communication (and generally also short range wireless communication) and has a wireless communication system 34. The smartphone 11 also here has a biometric sensor, in this case fingerprint reader 35. Other conventional elements of a smartphone device such as a touchscreen user interface 36 and a camera 37 are present but where their operation is conventional they are not described explicitly here.

FIG. 3B shows a mobile POS terminal 7 adapted to implement an embodiment of the disclosure. The mobile POS terminal 7 also possesses at least one processor 31a and at least one memory 32a, between them defining a computing environment 33a for performance of applications. The applications here include a mobile point of sale (MPOS) application 335 using a communications interface 34a for contactless communication with the user smartphone 11 and a user interface 36a (other communication options may also be provided, such as typically a connection to other networked devices within the wider network architecture). Features of the mobile POS application 335 will be described further below—as noted further below, this includes discussion of features that may be most effectively be carried out by the user smartphone but also includes discussion of features that may be carried out on the merchant POS device but may also be carried out in the merchant server.

Figure 4:
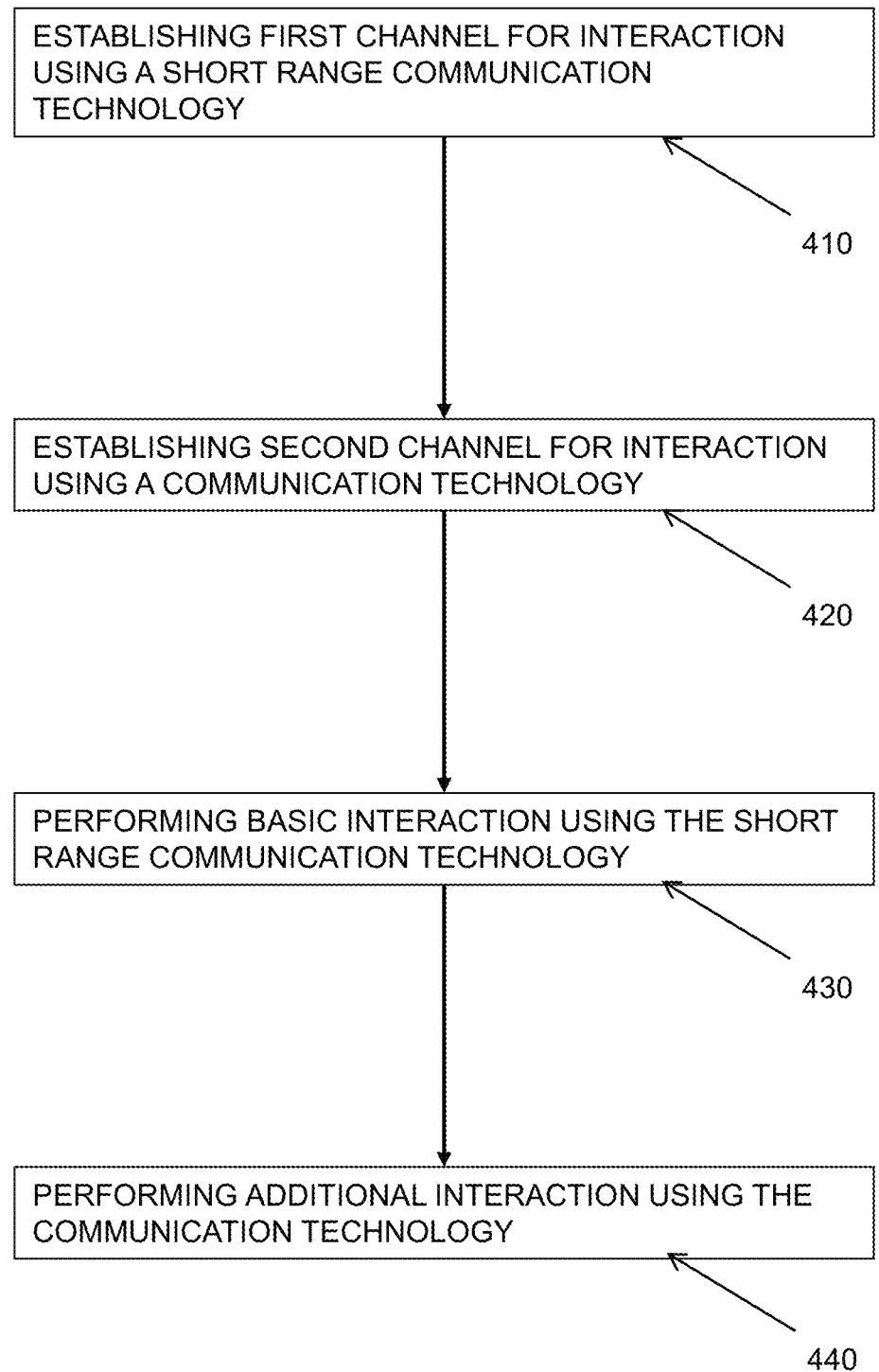
FIG. 4 shows in broad terms an embodiment of a method of the disclosure.

A general embodiment of a method according to the disclosure is illustrated schematically in FIG. 4. This approach allows for enhanced interaction between a user computing device—typically a user smartphone—and a merchant system, which may involve a merchant POS terminal or a merchant server, or both.

A first channel is established 410 for interaction using a short range communication technology. In most cases described below, this is a contactless interaction using NFC protocols, such as a contactless EMV transaction, but in other cases it can involve scanning of a barcode (for example a 2-D barcode such as a QRC code).

A second channel is established 420 for interaction using a communication technology. In some embodiments, this second channel may use a common technology to the first channel—for example, both the first channel and the second channel may involve NFC communication. In other embodiments, another communication technology will be available, such as Bluetooth or WiFi. Typically, where both devices support a full two-way communication link using sockets or WebSocket, then this will be used for the second channel.

The first channel is used to perform 430 a basic interaction using the short range communication technology. In a typical case, this will be a contactless EMV transaction using NFC protocols, but in other cases, it may involve scanning of a barcode to initiate a transaction or for another purpose.

The second channel is used to perform 440 an additional interaction using the communication technology. This approach allows the capabilities of the user smartphone to be utilised effectively to achieve a number of additional results, such as coupon redemption, user-initiated or controlled payment, and charity donation. Individual examples will be described in greater detail below.

It should be noted that the sequence of steps shown here is exemplary rather than necessary, as can be seen from the examples discussed below. In embodiments, the second channel may be established before the first channel is established, and some or all of the additional interaction may be performed before the basic interaction.

Figure 5:
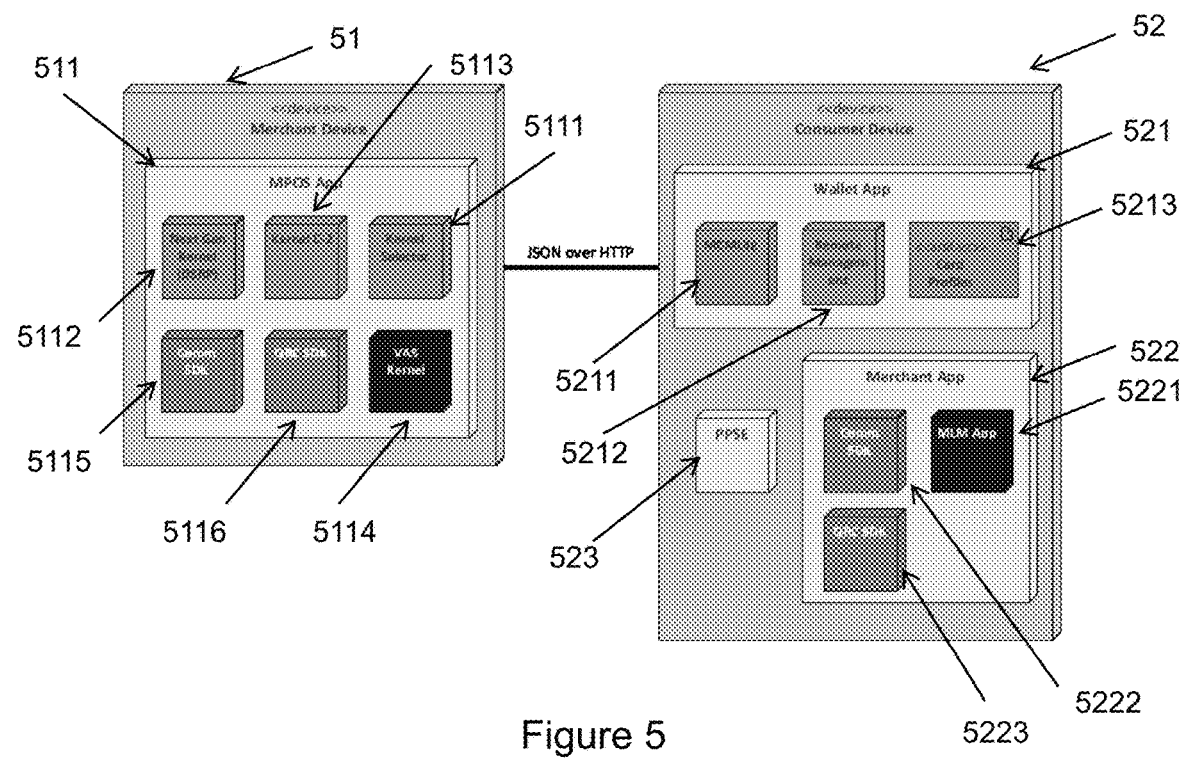
FIG. 5 shows a system architecture of an implementation of the disclosure, showing a user computing device and a terminal device.

FIG. 5 shows an exemplary functional architecture for an embodiment of the disclosure. There are two interacting devices shown in the main functional architecture—a merchant device 51 and a consumer device 52. The merchant device 51 will typically be a merchant point of sale terminal, frequently using mobile technologies to provide a mobile point of sale terminal (MPOS), but as noted above, certain merchant functionalities may be provided by a merchant server. The merchant server is not shown here, as functionally it operates as a conventional server either to support the merchant device 51 or in a client/server session with the consumer device 52. The consumer device 52 will typically be a user computing device, most typically a user smartphone.

In the embodiment shown, the merchant device 51 contains an mPOS (mobile Point of Sale) application (app) for payment acceptance and also for provision of value added services. Similarly, the consumer device 52 has a wallet application 521 for payment and also a merchant application 522 to enhance payment applications and to provide merchant-defined value added services.

This exemplary system supports multiple connectivity types, in this case in order of increasingly effective two-way data transfer:
1. NFC
2. Socket interface over Bluetooth
3. WebSocket over HTTP over WiFi or by use of mobile data The specific functionality shown in FIG. 5 will be described further below. To support functionalities described, it is desirable for the consumer device 52 to be adapted to support certain functionalities. One is for the consumer device 52 to support integration of third party applications with platform-specific biometrics or other consumer device cardholder verification methods (CDCVMs). Most typically this will be biometric data provided using a fingerprint reader, for example using a fingerprint recognitions suite such as Touch ID. Another is for the consumer device to support device pairing and interface switch mechanisms—this may involve supporting NFC Connection Handover to Bluetooth (Classic and/or LE), to WiFi, or to mobile data, and may involve handover from QR Code to the same set of communication technologies. Both sets of capabilities are widely found in current generations of smartphones.

The mPOS application 511 comprises the following set of components. The term "Next Gen" is here used for provision of enhanced capabilities beyond a basic EMV transaction, for example using the additional capabilities described here. "VAS" or "Value Added Services" is used for additional services provided by a merchant to a cardholder using embodiments described here.

Kernel Selector 5111—This is a component that is responsible for performing technology and application selection for performance of a transaction. It queries the consumer device's payment capability by issuing SELECT PPSE (Proximity Payment System Environment) and analyses the response. This process is in accordance with EMVCo contactless specifications, but is here adapted to determine whether enhanced functionality is available. The response from the consumer device to the SELECT command may be for example:
 1. Classic: the PPSE response fully conforms to the EMV Contactless Specifications.
 2. Enhanced: the PPSE response contains additional data not defined in the EMV Contactless Specifications.

Next Gen Kernel (DSRP) 5112—DSRP (Digital Secure Remote Payments) is a technology of the applicant for providing cryptographically secured digital payments using digitized cards. This component is designed to process a payment transaction in a DSRP-like manner (i.e. with a single exchange with payment application to retrieve the transaction record). This kernel is invoked when the Kernel Selector determines that the consumer device supports a suitable Next Gen-capable payment application through the enhanced PPSE response.

Kernel C-2 5113—This is a component that is designed to process a payment transaction as defined in the current EMV Contactless Specifications, Book C-2. The EMV Contactless Specifications are included herein by reference to the extent permissible by law—these can be found at https://www.emvco.com/specifications.aspx?id=21. This kernel is invoked when the Kernel Selector determines that the consumer device only supports current payment applications through the classic PPSE response.

VAS Kernel 5114—The Value Added Service (VAS) Kernel is a component that facilitates the processing of a value added service transaction. The functionality of this component will be described in examples below.

Comm SDK 5115—This a component that is designed to facilitate the communication between the mPOS App and the consumer device over any available channel, such as NFC, Bluetooth (Classic/LE), mobile data, Wi-Fi, and so on. This allows the mPOS App to process payment and VAS transactions in a communication agnostic manner, and provides utilities to manage the following: NFC connection handover to Bluetooth and HTTP; connection establishment and management; and data exchange.

QRC SDK 5116—This is a component that is designed to support the use of QR Code as an alternative connection handover mechanism to NFC. It provides functions such as QRC generation and QRC parsing.

The consumer device 52 has two applications—a wallet application 521 and a merchant application 522—and a PPSE application 523 for implementing the contactless transaction. The PPSE application 523 will perform in accordance with EMV contactless protocols, with additional functionality provided through the relevant components of the wallet application 521 and the merchant application 522 as will be described below.

The merchant application 522 is an application on the consumer device that is used as the primary interface for the services offered to the customers, such as the management of loyalty and coupons, delivery of offers, scanning of goods, instant check-out, and so on. It will typically be downloaded on to the consumer device from the merchant server or another server acting on the merchant's behalf, and may require registration by the user before first use. The components of an exemplary merchant application 522 are described below.

MLM App 5221—This is a middleware component providing loyalty items (coupons, discounts) and other value added services associated with a transaction with the merchant.

Comm SDK 5222—This is a component that is designed to facilitate the communication between the merchant application 522 and the merchant device 51 over any available channel, such as NFC, Bluetooth (Classic/LE), mobile data, Wi-Fi, and so on. This allows the Merchant App to process payment and VAS transactions in a communication agnostic manner, and provides utilities to manage: NFC connection handover to Bluetooth and HTTP; connection establishment and management; and data exchange.

QRC SDK 5223—This is a component that is designed to support the use of QR Code as an alternative connection handover mechanism to NFC.

The wallet application 521 is an application on the consumer device that is responsible for the management of digitized payment credentials and processing of payment transactions—it has the functionality of a conventional digital wallet but it is adapted to be part of a system that will support value added services. It has the following components, which may all be found in existing digital wallet systems.

MCMLite 5211—This component contains the business logic to facilitate processing of a payment transaction, whether in the "card-like" mode or DSRP mode; this component also directly manages the PPSE response.

Remote Management 5212—This component is designed to facilitate the management of payment credentials.

Card Profiles 5213—This is a database containing the digitized payment credentials.

By using the merchant application 522 in a second communication channel with the merchant device 51, new capabilities can be provided for the consumer in interacting with a merchant and significant enhancements made to the user experience. This will be illustrated below with reference to a series of different use cases. Two significant functional enhancements are used in a number of these use case.

A first significant functional enhancement is "tap-and-wireless" model for conducting a transaction. Generally a mobile device supports multiple connectivity options—a cellular telephone will typically support Bluetooth and WiFi in addition to cellular telephony for mobile data and NFC. Current contactless transactions use a "tap-and-go" model using a short-range, short-duration NFC connection with alternatives (such as QR codes) having a similar functionality—these preserve privacy but are essentially directed to the specific transaction mechanism. The tap-and-wireless model allows other communication paths to be used to provide additional functionality ("value added services") to offer new functionality to users and to improve the user experience.

A second significant functional enhancement is on-device cardholder interaction. When using a conventional physical payment card, the primary interface for the customer during check-out is the merchant device (terminal). This limits the options available to the user, and can cause practical difficulties, such as the need to use switch cards at the terminal, in complex transactions, such as where coupons or loyalty points are used for partial completion of a transaction. By taking advantage of capabilities of the consumer device, the user experience can be enhanced with new capabilities leading to more effective payment models.

The use cases below provide examples of both modes of transaction processing discussed above: conventional merchant initiated payment and also consumer initiated payment. With merchant initiated payment, three types of user experiences: "tap and wireless" (including NFC tap, QR code read or other pairing mechanisms to initiate the wireless connection) as described above, but also two tap and "tap and go" models, which may be needed where the second communication channel needs to use a legacy approach (for example, by reusing the NFC connection). The various process sequences are illustrated in the sections below.

Coupon Payment

Figure 6:
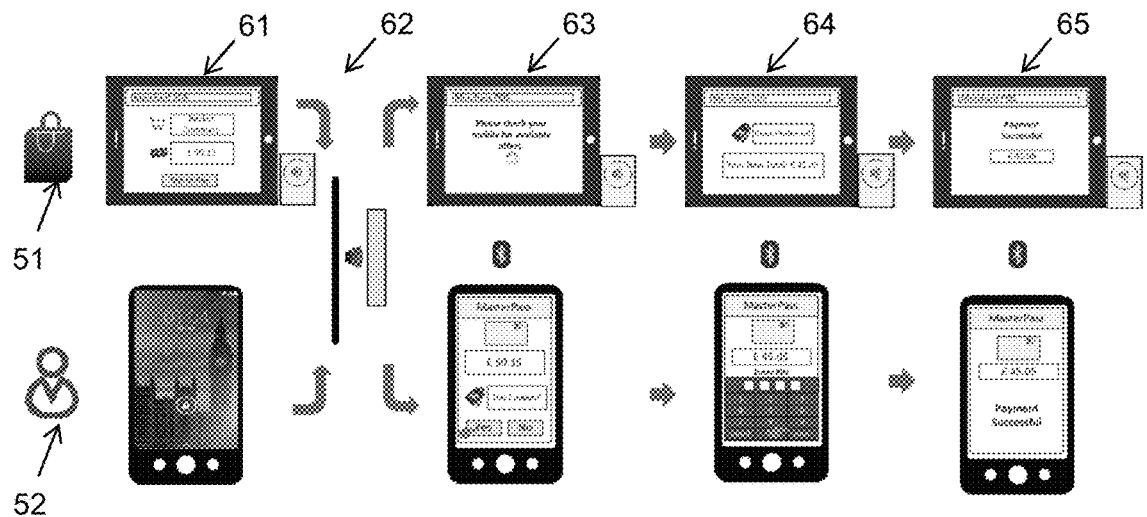
FIG. 6 shows a first enhanced payment scenario according to an implementation of the disclosure in which a coupon is used in association with the payment.
Figure 7:
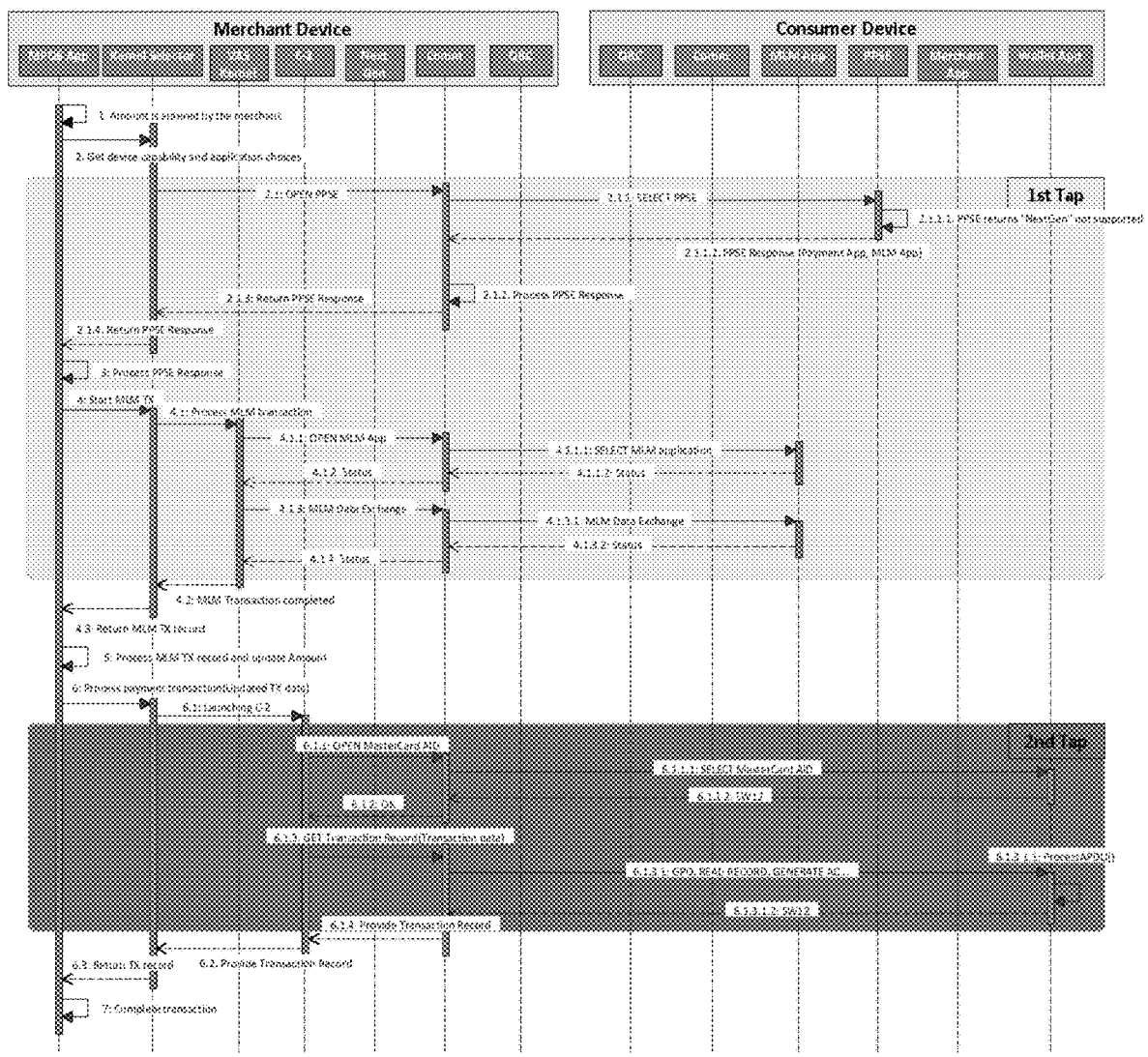
FIG. 7 shows a process flow for the first payment scenario using a legacy EMV architecture.
Figure 8:
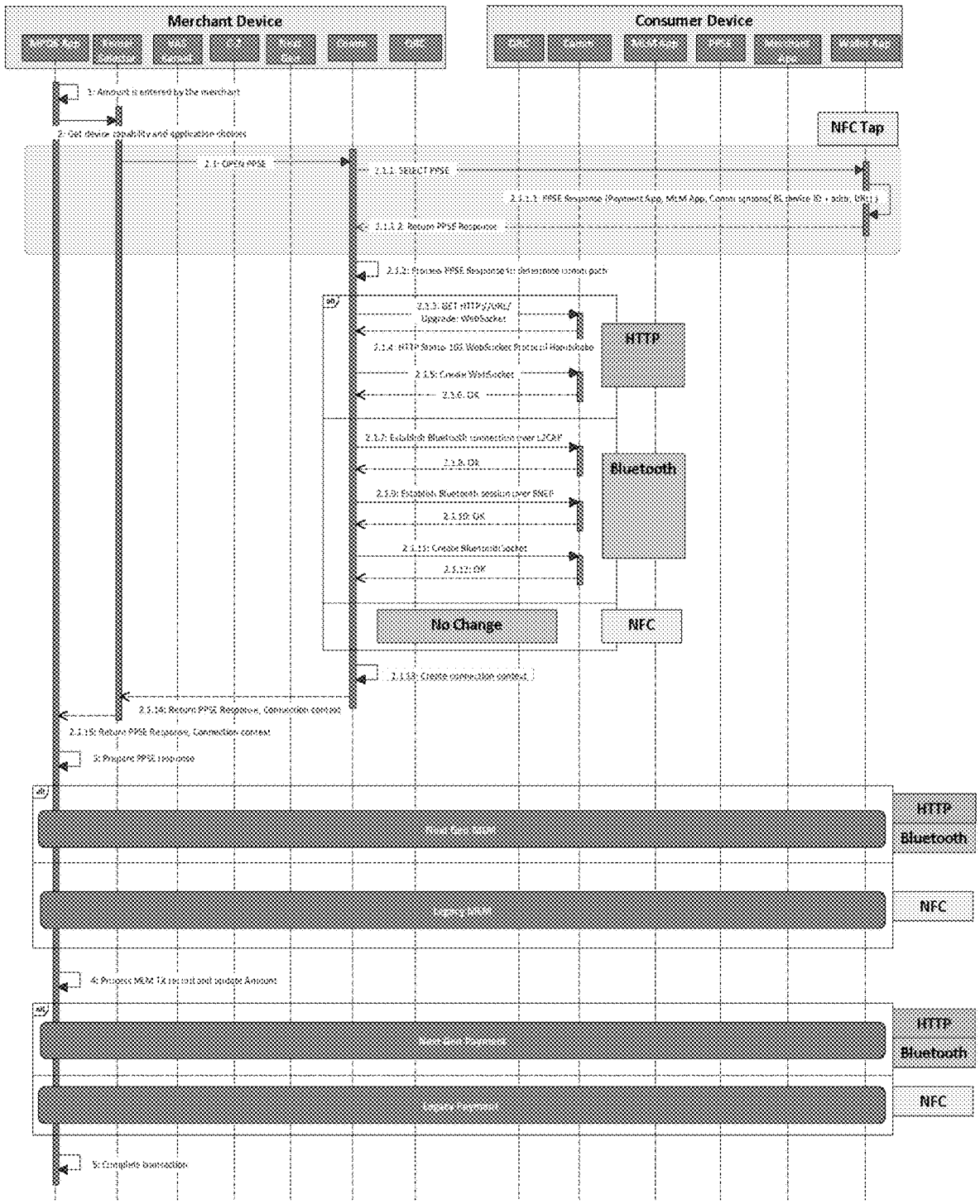
FIG. 8 shows a process flow for the first payment scenario using an additional wireless channel.
Figure 9:
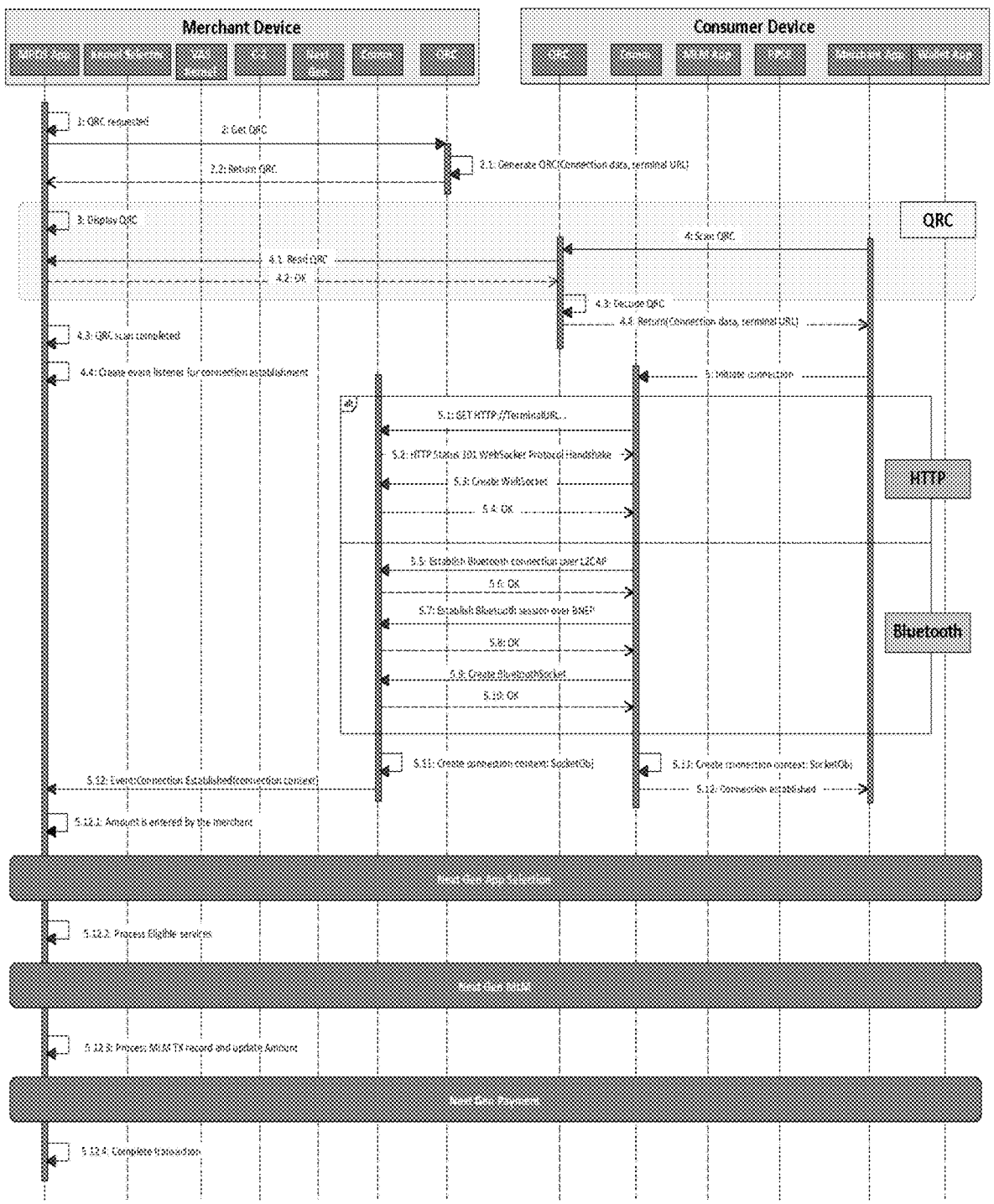
FIG. 9 shows a process flow similar to that of FIG. 8, but in which QRC rather than NFC is used to initiate the transaction.
Figure 10:
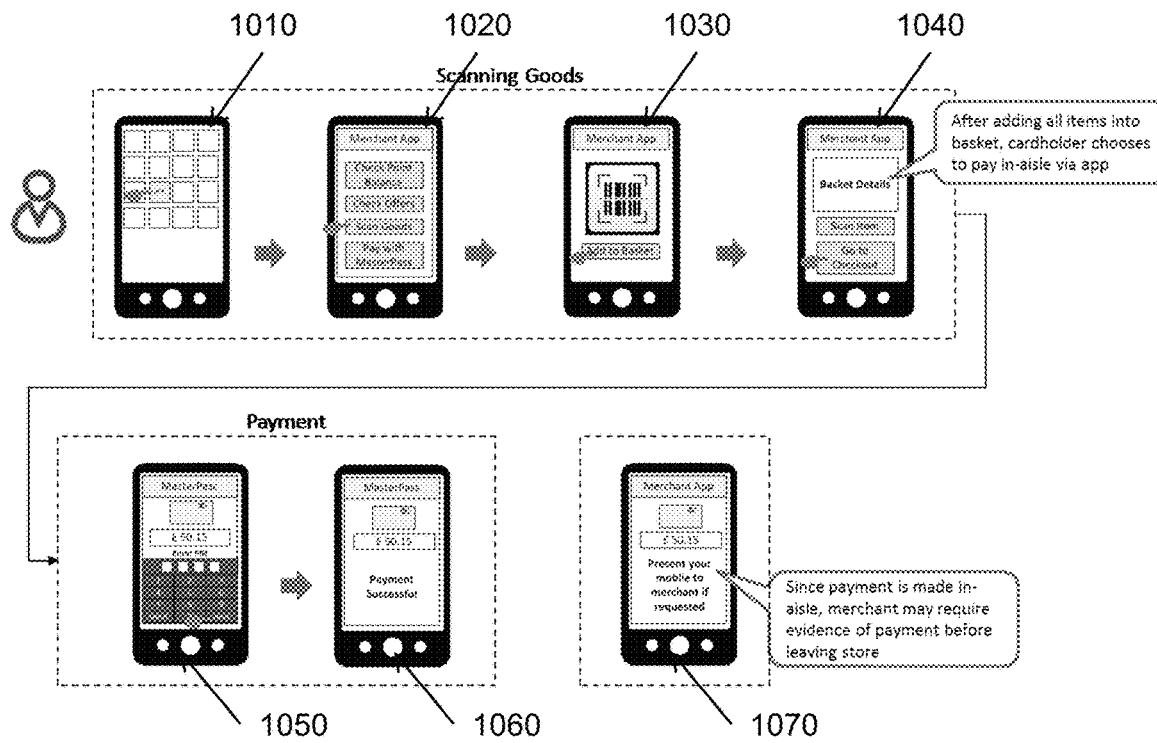
FIG. 10 shows a second enhanced payment scenario according to an implementation of the disclosure in which a customer transacts in-aisle rather than at a merchant checkout.

This is illustrated generally in FIG. 6, with reference to FIGS. 7 to 9 which show different embodiments and their associated process flows. The payment with coupons use case illustrates that through the use of "tap-and-wireless" and "on-device cardholder interaction", it is possible to optimize a complex payment scenario involving loyalty and coupons in a face-to-face environment.

If a physical card is used as the payment instrument, a customer generally has to swap between multiple cards in order to complete a payment with loyalty points and/or coupons. If we consider mobile phones as the payment instrument, then the user experience is improved for remote payment as loyalty points and coupons may be available in digital form, but there is not an equivalent face-to-face model.

FIG. 6 shows a tap-and-wireless model for contactless payment using coupons in accordance with an embodiment of the disclosure. A payment is established 61 using a conventional contactless "tap" between a merchant device 51 (in this case a mobile POS terminal) and a consumer device 52 (in this case a smartphone). This establishes basic parameters for a transaction (such as who the transaction will be between) but allows certain aspects of the transaction to be varied or completed using the second communication channel. This second communication channel is established 62 as part of the "tap" process—in this case, NFC is used to establish a Bluetooth connection (this is a conventional process according to NFC and Bluetooth standardisation and will not be described further here). The second, Bluetooth, communication channel establishes interaction between the mPOS application 511 on the merchant device 51 and the merchant application 522 on the consumer device 52, which applications now acquire the focus 63 on their respective devices, with the merchant device 51 directing the consumer to review his or her own device for offers, and the merchant application 522 on the consumer device indicating that there is a coupon available for use, and prompting the user as to whether or not to use the coupon. The user here elects to use the coupon, and this is communicated over Bluetooth, with both terminals showing 64 modified parameters for the transaction—the merchant device 51 indicates that the coupon has been redeemed and that the total for the transaction has been reduced, and the consumer device 52 indicates the new total and asks the user for authentication to complete the modified transaction (in this case by PIN entry at the consumer device—an alternative could be by fingerprint scanning). The transaction then completes as for a conventional contactless transaction using a digitised card (using the digital wallet and the wallet service), with payment success confirmed 65 to both parties by the transaction infrastructure in a conventional manner.

Where an additional connection using a full two-way communication protocol such as Bluetooth is not available, it may be necessary to re-use an NFC connection. In this case, functionality may be provided by multiple taps—a tap for coupon use, a tap for payment, and possibly another tap or comparable interaction for customer verification (CD-CVM).

With tap-and-wireless and on-device interaction, the user experience is particularly effective as the customer only taps once and remaining processing can occur seamlessly.

Different process flows for these approaches are shown in FIGS. 7 to 9. Each process flow shows the interacting components (as indicated in FIG. 5) and the nature of their interaction, with the process being divided into a number of stages, each of which may involve multiple steps.

FIG. 7 shows use of a two-tap NFC approach. In stage 1, the merchant enters the amount to be paid and the merchant device uses the Kernel Selector to identify the PPSE at the consumer device (stages 2 and 3). On establishing that the interaction uses a legacy approach, the MLP App is opened and data exchanged to form a first "loyalty" transaction (stage 4). The merchant modifies the amount of the transaction accordingly (stage 5) and processes the transaction as a conventional NFC contactless payment with the second tap (stage 6) to completion (stage 7).

FIG. 8 shows the overall approach where other communication methods may be available. The stages are as for FIG. 7, but in processing the PPSE response the communication path is determined and a new path developed if Bluetooth or WiFi/mobile data is available. If an HTTP connection can be made, a WebSocket is established, or if Bluetooth is available, a Bluetooth Socket is created. If HTTP or Bluetooth is available, loyalty and payment interactions take place using those connections, with the initial NFC tap having served essentially to identify the PPSE and set up the new connection.

FIG. 9 shows a modified approach where instead of an NFC tap, the initial interaction is a scan of a QRC code. The merchant device requests (stage 1) and generates (stage 2) a QRC which is then displayed (stage 3) by the merchant device and scanned and decoded (stage 4) by the consumer device, with the merchant device creating an event listener to determine if the consumer device is seeking to make a connection. The consumer device then initiates establishment of an HTTP or Bluetooth connection with the merchant device (stage 5), at the end of which an amount is entered by the merchant. App selection, loyalty and payment following using approaches according to the embodiments described.

In-Aisle Payment

The in-aisle payment case illustrates an alternative customer check-out experience at a bricks-and-mortar store using the merchant application 522 as the primary shopping tool. This is effective for this user, as the merchant application 522 may then be the primary portal for access to merchant services such as loyalty, coupon, offers, instant price look-up, and instant check-out.

The user in this case may launch 1010 the merchant application 522 and select 1020 the "Scan Goods" option from a merchant application menu. The merchant application 522 is configured in this mode to act as a barcode reader using the camera of the consumer device—the user scans 1030 a barcode of a product and adds it to the basket—this is essentially similar to the self-scan option provided in many supermarkets, where a proprietary hand scanner for use with the supermarket's own system is released to participants (typically by scanning a participant loyalty card), but runs through the merchant application 522 rather than on proprietary hardware.

Once all items are scanned, the user may select 1040 the option of going to a checkout screen. Before checkout completes, customer verification 1050 is required (here by PIN—as before, fingerprint is another possible option) and payment takes place using a digitized card in the wallet, with a success message 1060 being returned.

In this case, there is a different basic interaction (or set of interactions)—the scanning of barcodes into the user application, with payment being made directly through the cardholder's wallet. As there has not been a direct interaction with the merchant systems resident in the merchant store, evidence of payment may be required before the consumer leaves the store—this may be provided 1070 through a mobile device screen in the user application.

This approach uses additional capabilities provided by mobile telephone capability extensively. The ability to make a data connection to merchant systems—in this case, a merchant server—allows the customer to have instant price updates, coupon delivery, and so on included directly in bricks-and-mortar shopping. The on-device user interaction capability allows for the selection of coupons, use of loyalty points, and so on. The presence of a digital camera allows for barcode scanning. Where present, on-device CVM can also be provided through a biometric sensor such as a fingerprint scanner.

In this example, there is a different short-range basic interaction—barcode scanning of devices—with interaction with merchant systems being over a data channel to the merchant server through the merchant application.

Cardholder Amount Entry

The capability for the cardholder to initiate or control aspects of the transaction allow new use models to be developed to provide a better range of customer experiences.

Figure 11:
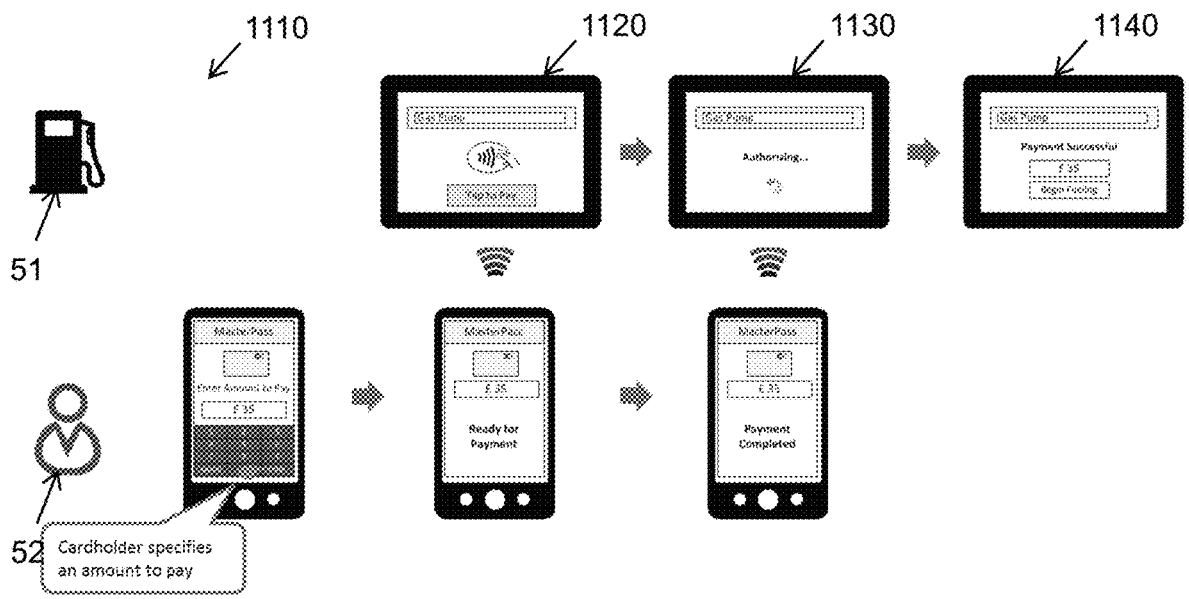
FIG. 11 shows a third enhanced payment scenario according to an implementation of the disclosure in which a customer initiates a transaction, in this case payment at a fuel pump.

One exemplary situation is fuel payment at the pump on a petrol station forecourt. At present this process is protracted, and requires credit card pre-authorisation and (where used) a separate loyalty interaction—in some cases address verification may even be required. A much more straightforward model is available with cardholder initiated payment, as shown in FIG. 11.

In this approach, the cardholder opens the merchant application 522 on the consumer device, starts 1110 a cardholder initiated transaction for the merchant and enters an amount to pay. When this is entered, the consumer device 52 shows 1120 that payment is ready to be made, matching the "ready to pay" screen on the merchant device (here a POS terminal integrated with the petrol pump assembly), and a "tap" is made to initiate an NFC contactless transaction. The merchant device 51 authorises 1130 the transaction with the consumer device indicating that the payment is complete, with a success message being displayed 1140 on the merchant device if authorisation is successful. The customer can then begin fuelling—the pump may then be programmed to dispense fuel for the amount of the transaction (an option already available on some conventional pumps where there has been a prepaid amount).

Figure 12:
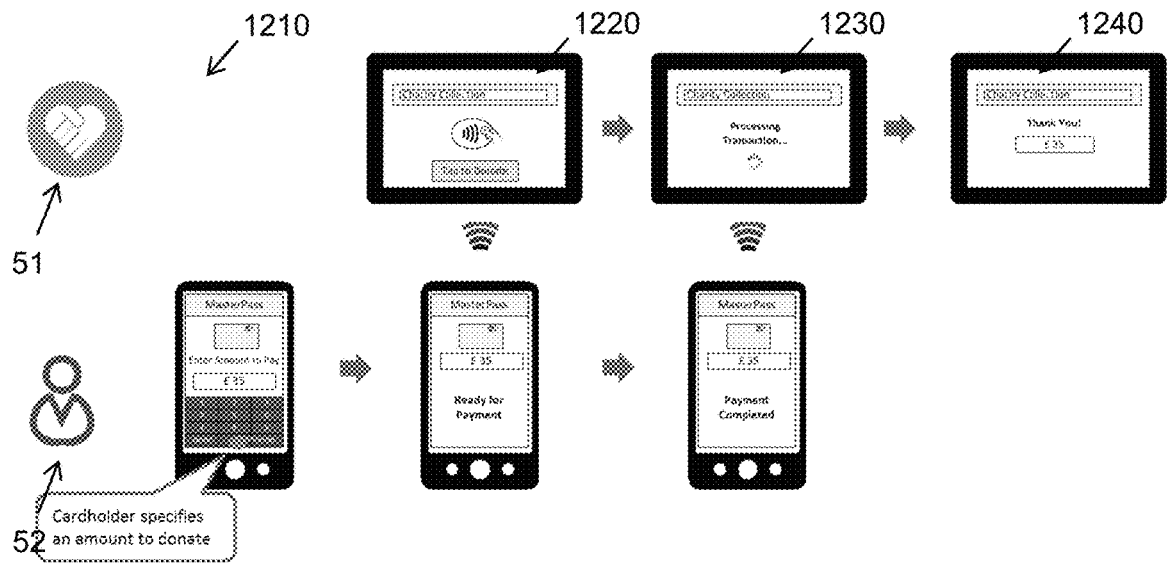
FIG. 12 shows a fourth enhanced payment scenario according to an implementation of the disclosure in which the customer makes a charity donation.

Another exemplary case for consumer initiated payment is charity collection, as shown in FIG. 12. The steps followed are essentially as shown in FIG. 11. The user opens the application and specifies 1210 an amount to donate. A tap is then made 1220 to establish an NFC connection between the consumer device 52 and the merchant device 51 (in this case a POS terminal in a mode to accept a charity donation). The transaction is authorised 1230 with a completion screen presented on the consumer device, with a success screen shown 1240 at the merchant device 51 on completion.

Process flows for loyalty and payment using legacy (NFC) and additional communication approaches are shown in more detail in FIGS. 13 to 18.

Figure 13:
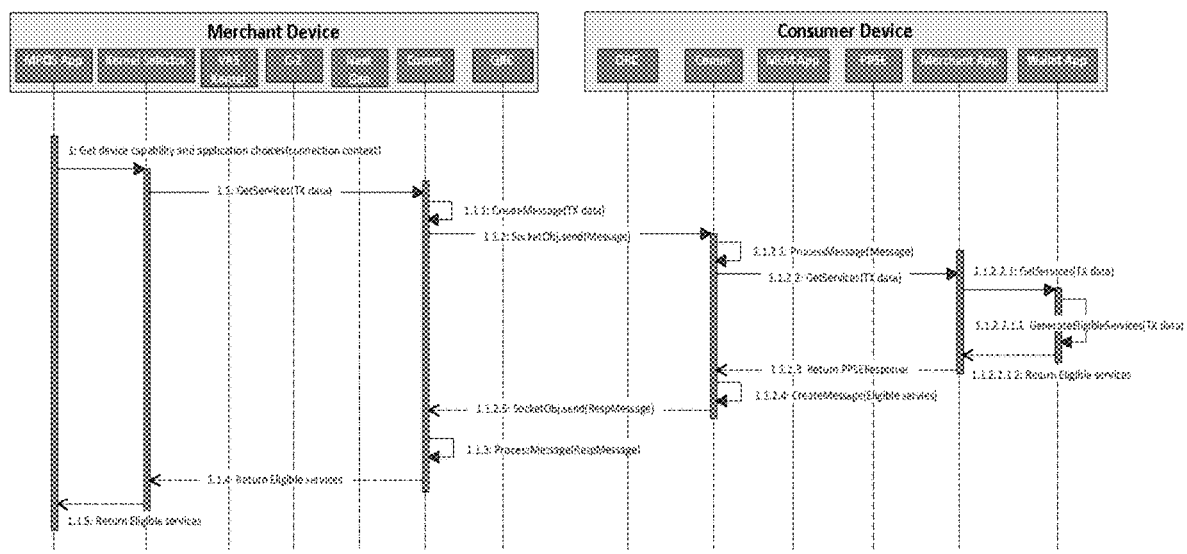
FIG. 13 shows application selection over an additional connection according to an implementation of the disclosure.

FIG. 13 shows application selection over an additional connection. This comprises the merchant device determining the consumer device capability and establishing application choices. GetServices is used to make this request, with the communication mechanisms forming, sending and receiving an appropriate message over the established socket. This is processed by the merchant app with reference to the wallet app, and an Eligible Services message is returned with the PPSE response.

Figure 14:
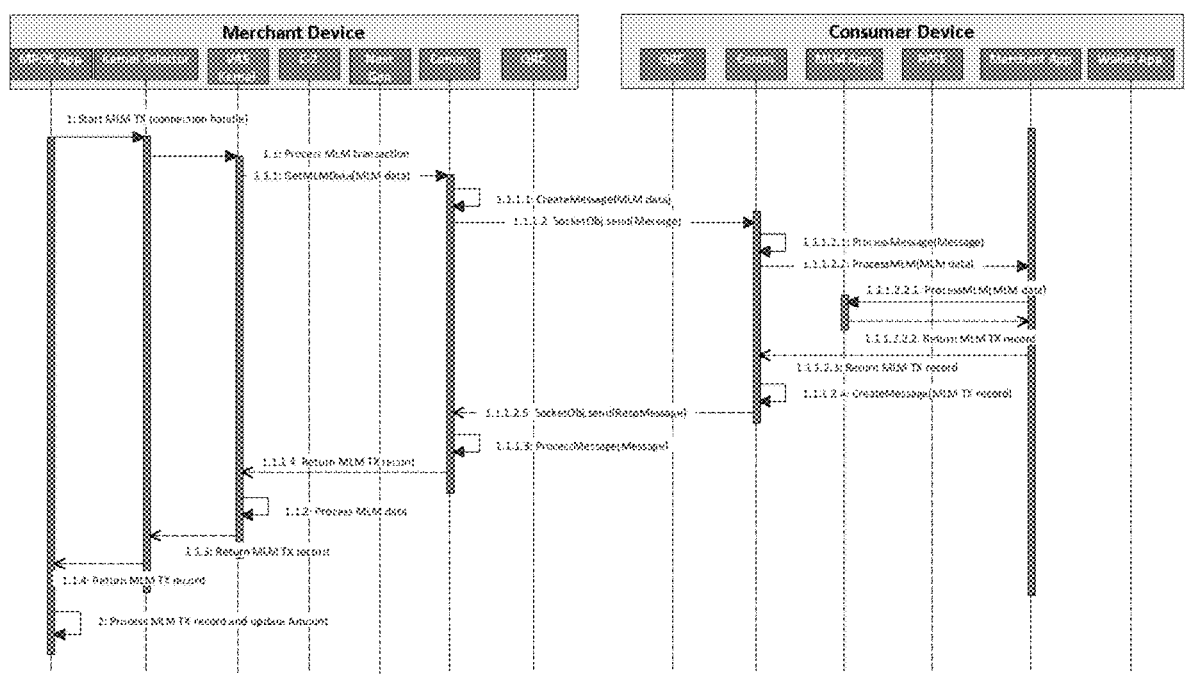
FIG. 14 shows loyalty interaction over an additional connection according to an implementation of the disclosure.

FIG. 14 shows loyalty interaction over an additional connection. An MLM transmission is started, with a GetMLMData message sent by the VAS Kernel of the merchant device to the consumer device. This is processed by the merchant app with reference to the MLM app, and an MLM TX record returned indicating a loyalty transaction to be made. This is received and processed at the merchant device.

Figure 15:
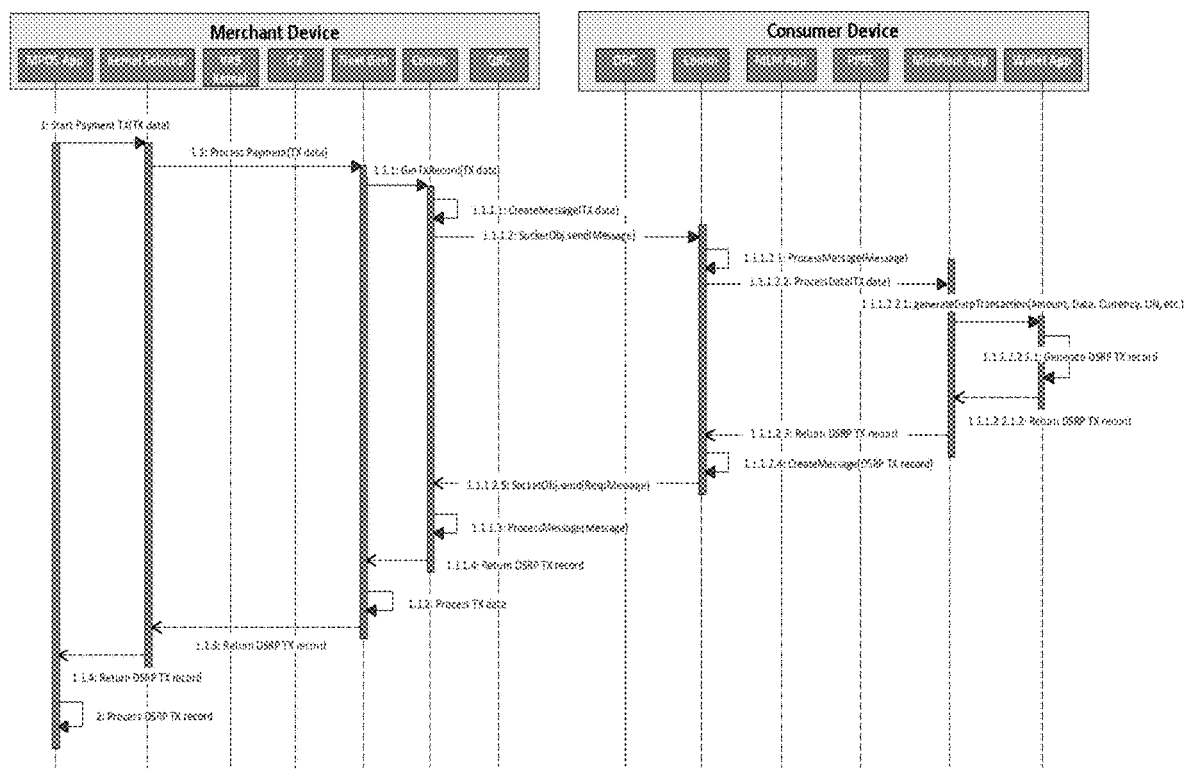
FIG. 15 shows payment interaction over an additional connection according to an implementation of the disclosure.

FIG. 15 shows payment interaction over an additional connection. In this case when payment is started, the merchant device calls on the Next Gen rather than the C-2 kernel as the additional channel is to be used for the transaction. A ProcessData message is sent to the merchant app, with then generates a DSRP transaction by reference to the wallet app. A DSRP TX record is returned to the MPOS app, and processed.

Figure 16:
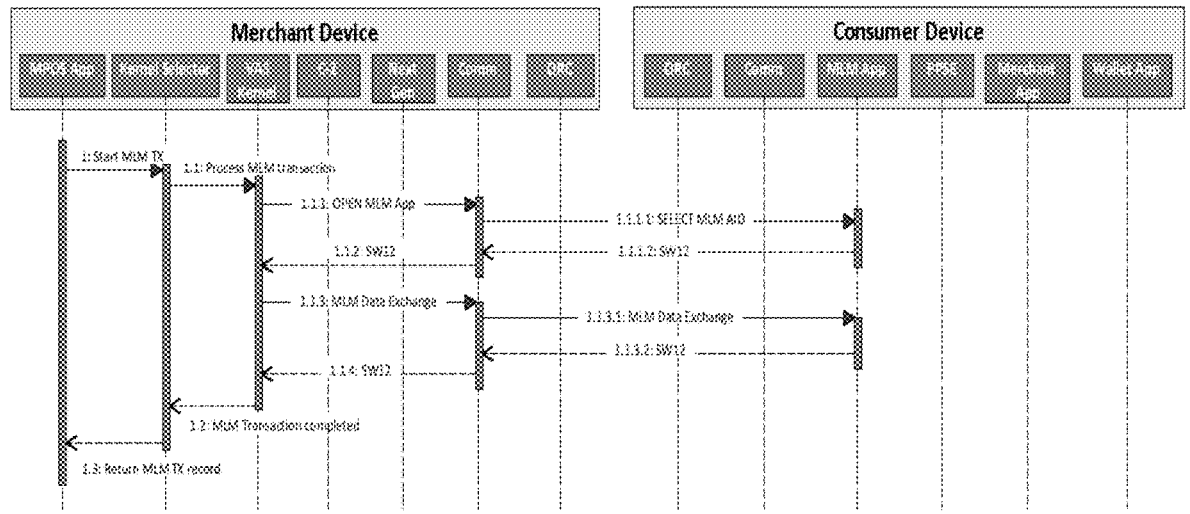
FIG. 16 shows loyalty interaction using a legacy interface.

FIG. 16 shows loyalty interaction using a legacy interface. The MLM transaction is started at the merchant device, with application identifier selection used to open the MLM app, after which there is MLM data exchange between the VAS Kernel and the MLM app, with an MLM TX record being returned to the MPOS app.

Figure 17:
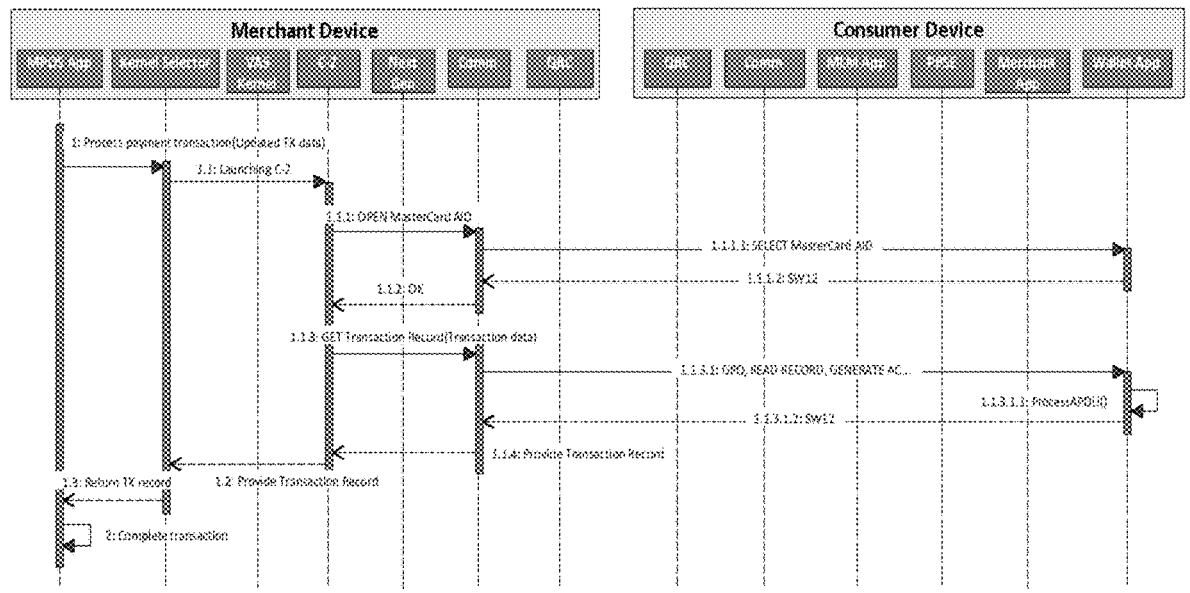
FIG. 17 shows payment interaction using a legacy interface.

FIG. 17 shows payment interaction using a legacy interface. Here, the merchant device launches the C-2 Kernel and opens the wallet app by AID (application identifier), continuing with GET Transaction Record as for a conventional contactless transaction.

Figure 18:
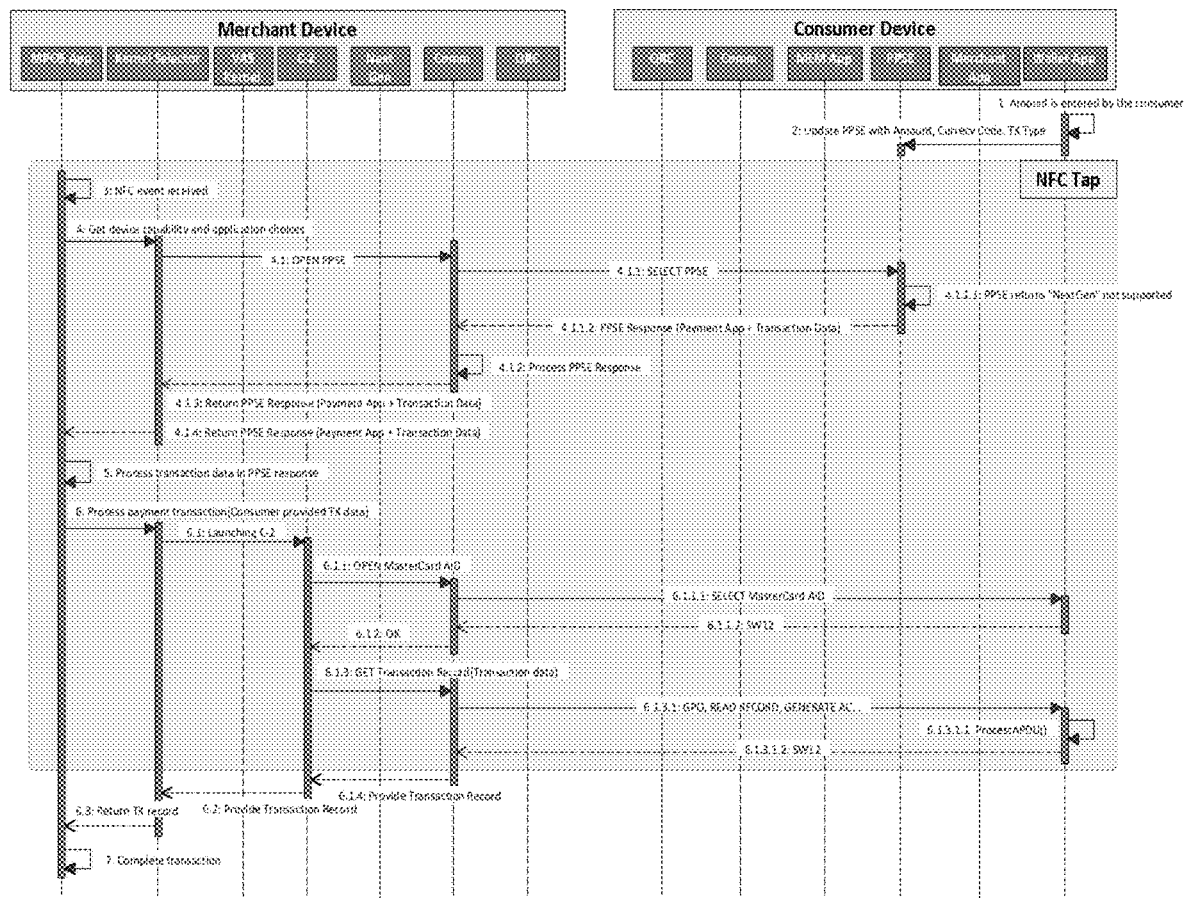
FIG. 18 shows a process flow for consumer initiated payment as used in the third and fourth payment scenarios.

FIG. 18 shows a process flow for consumer initiated payment as used in the third and fourth payment scenarios. In this case, the consumer enters an amount (stage 1) and the PPSE is updated with amount, currency code and transaction type (stage 2). There is then a tap (stage 3) after which the merchant device obtains consumer device capability and PPSE (stage 4). The PPSE response is processed (stage 5) after which the transaction can be processed (stage 6) with the C-2 Kernel, using AID and GET Transaction Record as before, with the relevant transaction elements already present in the PPSE, with the merchant device completing the transaction (stage 7).

Other uses may be made of the approach described in this disclosure beyond providing enhancements to a basic payment experience. Where an NFC "tap" is used for access control to a building or transportation system, a second channel can similarly be established to provide an enhanced information transfer. For example, in the case of a transportation system a seat reservation could be added to a ticket according to user preferences in a travel application. Similarly, on access to a facility, meeting room reservations or hot desking arrangements could be made from a building control application. The present disclosure provides a technical solution that enables significant additional capabilities in a wide range of use cases based around a short range communication with limited inherent capability for information exchange.

As the person skilled in the art will appreciate, modifications and variations to the above embodiments may be provided, and further embodiments may be developed, without departing from the spirit and scope of the disclosure. Reference to standards and proprietary technologies are provided for the purpose of describing effective implementations, and do not limit the scope of the disclosure.

The invention claimed is:

1. A method of enhanced interaction between a first computing device and a second computing device, the method comprising:

establishing, by a second computing device, a first channel between a first computing device and the second computing device using a short range communication technology, the second computing device supporting both an enhanced interaction mode of operation and a standard mode of operation depending on a mode of operation of the first computing device;

performing, by the second computing device, a first interaction comprising a contactless transaction between the first computing device and the second-computing device over the first channel and, as part of the first interaction, receiving information from the first computing device;

determining, by the second computing device, that the first computing device supports an enhanced interaction mode of operation based on the information received from the first computing device in the first interaction;

obtaining, by the second computing device over the first channel, credentials to establish a second channel between the first computing device and the second computing device;

establishing, by the second computing device, the second channel for communication between the first computing device and the second computing device using the credentials; and performing, by the second computing device, an additional interaction using the second channel and a communication technology different from the short range communication technology, the additional interaction comprising one of modifying or augmenting the contactless transaction.

2. The method of claim 1, wherein the first computing device is a customer computing device and the second computing device is a merchant computing device.

3. The method of claim 2, wherein the short range communication technology is NFC or by barcode reading.

4. The method of claim 3, wherein the contactless transaction is performed according to EMV protocols.

5. The method of claim 1, wherein the additional interaction provides a loyalty interaction associated with the contactless transaction.

6. The method of claim 1, wherein the additional interaction enables the customer to initiate the transaction or to modify parameters of the transaction.

7. The method of claim 1, wherein the communication technology for the additional interaction is Bluetooth, WiFi or mobile data.

8. The method of claim 7, wherein the credentials include a websocket address through which a socket connection is established for communication between the first computing device and the second computing device.

9. The method of claim 1, wherein the short range communication technology and the communication technology for the additional interaction are both NFC, and wherein one NFC tap connection is made for the first interaction and another NFC tap connection is made for the additional interaction.

10. An institution computing device adapted for enhanced interaction with a personal computing device, the institution computing device having a processor, a memory and at least one communication technology including a short range communication technology, wherein the institution computing device:
- establishes a first channel for connection with a personal computing device using a short range communication technology;
- performs a first interaction comprising a contactless transaction with the personal computing device over the first channel and, as part of the first interaction, receives information from the personal computing device;
- determines that the personal computing device supports an enhanced interaction mode of operation based on the information received from the cardholder device in the first interaction;
- obtains, over the first channel, credentials to establish a second channel for connection with the personal computing device;
- establishes the second channel for communication with the personal computing device using the credentials; and
- performs an additional interaction with the personal computing device using the second channel and a communication technology different from the short range communication technology, the additional interaction comprising one of modifying or augmenting the contactless transaction.

11. The institution computing device of claim 10, wherein the institution computing device is a merchant point of sale terminal and the first interaction is a contactless transaction.

* * * * *